(12) United States Patent
Noguchi et al.

(10) Patent No.: US 12,072,574 B2
(45) Date of Patent: Aug. 27, 2024

(54) DISPLAY APPARATUS

(71) Applicant: Japan Display Inc., Tokyo (JP)

(72) Inventors: Michikazu Noguchi, Tokyo (JP);
Motoki Tsuda, Tokyo (JP); Kazuki Ichihara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/328,810

(22) Filed: Jun. 5, 2023

(65) Prior Publication Data

US 2023/0408863 A1 Dec. 21, 2023

(30) Foreign Application Priority Data

Jun. 8, 2022 (JP) .................. 2022-092888

(51) Int. Cl.
*G02F 1/13357* (2006.01)
*F21V 8/00* (2006.01)

(52) U.S. Cl.
CPC ..... *G02F 1/133603* (2013.01); *G02B 6/0068* (2013.01); *G02B 6/0073* (2013.01); *G02B 6/0083* (2013.01); *G02B 6/0086* (2013.01)

(58) Field of Classification Search
CPC ............ G02F 1/133603; G02B 6/0068; G02B 6/0073; G02B 6/0083; G02B 6/0086
See application file for complete search history.

(56) References Cited

U.S. PATENT DOCUMENTS

| | | | | |
|---|---|---|---|---|
| 10,930,233 | B1* | 2/2021 | Huang | G02F 1/13338 |
| 2007/0008740 | A1* | 1/2007 | Lee | G02F 1/133603 |
| | | | | 362/612 |
| 2010/0201288 | A1* | 8/2010 | Mozer | G02B 27/0172 |
| | | | | 315/312 |
| 2022/0171222 | A1* | 6/2022 | Gou | G02F 1/1334 |
| 2022/0373840 | A1* | 11/2022 | Song | G02F 1/133606 |

FOREIGN PATENT DOCUMENTS

JP 2021-033043 A 3/2021

* cited by examiner

*Primary Examiner* — Mary Ellen Bowman
(74) *Attorney, Agent, or Firm* — Michael Best & Friedrich LLP

(57) ABSTRACT

A plurality of light emitting diode elements of a display panel (display apparatus) include: a first light emitting diode element, a second light emitting diode element and a third light emitting diode element. In the X direction, a plurality of the first light emitting diode elements, single or a plurality of the second light emitting diode elements and single or a plurality of the third light emitting diode elements are repeatedly arranged. The total number of the first light emitting diode elements is larger than the total number of the second light emitting diode elements. Light flux of the light of the first color emitted from the first light emitting diode elements is lower than light flux of the light of the second color emitted from the second light emitting diode elements.

8 Claims, 9 Drawing Sheets

DISPLAY APPARATUS

CROSS-REFERENCE TO RELATED APPLICATION

The present application claims priority to Japanese Patent Application No. 2022-92888 filed on Jun. 8, 2022, the disclosure of which is incorporated herein by reference.

TECHNICAL FIELD OF THE INVENTION

The present invention relates to a display apparatus using a liquid crystal layer.

BACKGROUND OF THE INVENTION

As display apparatuses, there are display apparatus each including: a light emitting module in which red, green and blue light emitting diode elements, the number of which is one, is packaged; and a light guide body arranged at a position facing a light emitting point of the light emitting module (see Japanese Patent Application Laid-Open Publication No. 2021-33043 (Patent Document 1)).

RELATED ART DOCUMENT

Patent Document

Patent Document 1: Japanese Patent Application Laid-Open Publication No. 2021-33043

SUMMARY OF THE INVENTION

The invention of the present application has developed a transparent display apparatus allowing an observer to recognize a display image and a background overlapping each other. Such a transparent display apparatus needs to have a property of a front surface and a back surface, each of which transmits visible light. Therefore, a light source unit for displaying images is arranged on a side surface of the light guide panel. In the light source unit, a light emitting diode element emitting any light of, for example, red color (may be simply referred to as "R" below), green color (may be simply referred to as "G" below) and blue color (may be simply referred to as "B" below) is arranged. For example, as described in the Patent Document 1, a method of, in the light source unit, arranging a plurality of modules in each of which the respective light emitting diode elements emitting the light of RGB are modularized, is conceivable. However, it has been found out that a method of arranging the light emitting diode elements of three types into one module has the following problems.

In order to adjust white balance of a transparent display apparatus, a luminance (applied electric current or lighting time) of the light emitting diode element of each color is adjusted based on chromaticity of each color of RGB in monochromatic case. If there is difference in the chromaticity of the light in monochromatic case emitted from the light emitting diode element, it is difficult to efficiently use the light emitting diode elements of the respective colors. For example, a part of the light emitting diode elements is used at a value lower than a rated power output in order to decrease the luminance. Alternatively, the applied electric current or the lighting time of another part of the light emitting diode elements is made larger in order to increase the luminance, which results in increase of a heat generation amount.

A display apparatus according to an embodiment of the present invention includes: a first substrate including a first front surface and a first back surface opposite to the first front surface; a liquid crystal layer arranged on the first front surface of the first substrate; a light guide panel including a first surface facing the first front surface, a second surface opposite to the first surface and a first side surface crossing the first surface and the second surface; a light source unit including a plurality of light emitting diode elements arranged in a first direction at a position facing the first side surface of the light guide panel. The plurality of light emitting diode elements include a first light emitting diode element capable of emitting light of first color, a second light emitting diode element capable of emitting light of second color different from the first color, and a third light emitting diode element capable of emitting light of third color different from the first color and the second color. In the first direction, a plurality of the first light emitting diode elements, single or a plurality of the second light emitting diode elements and single or a plurality of the third light emitting diode elements are repeatedly arranged. The total number of the first light emitting diode elements is larger than the total number of the second light emitting diode elements. Light flux of the light of the first color emitted from the first light emitting diode elements is lower than light flux of the light of the second color emitted from the second light emitting diode elements.

BRIEF DESCRIPTIONS OF THE DRAWINGS

DESCRIPTIONS OF THE PREFERRED EMBODIMENTS

Figure 1:
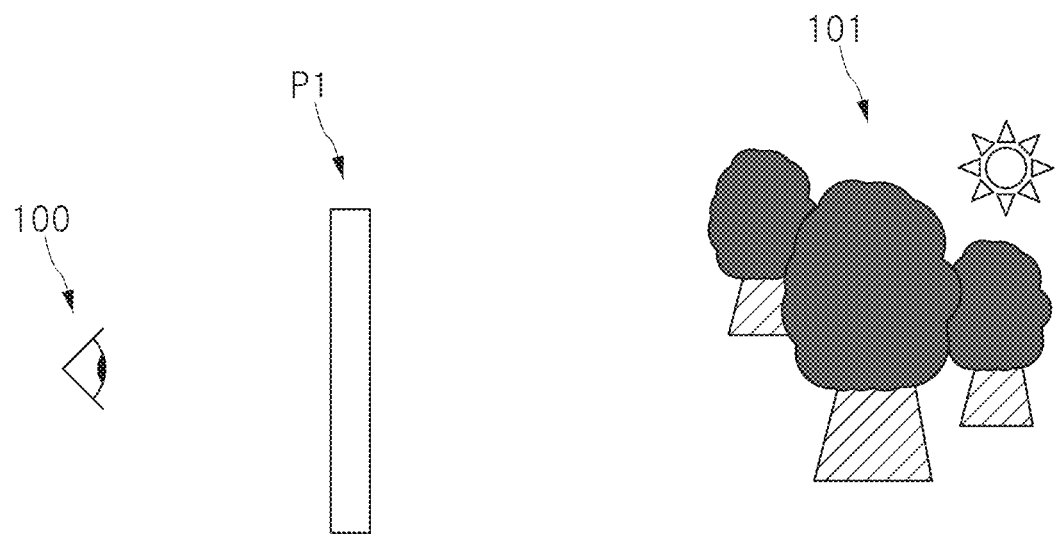
FIG. 1 is an explanatory diagram illustrating a positional relation in a case in which an observer on one surface side of a transparent display panel apparatus visually recognizes a background on the other side through the transparent display panel apparatus.

The following is explanation for each embodiment of the present invention with reference to drawings. Note that disclosure shows only one example, and appropriate modification with keeping the concept of the present invention which can be easily anticipated by those skilled in the art is obviously within the scope of the present invention. Also, in order to make the clear description, a width, a thickness, a shape, and others of each portion in the drawings are schematically illustrated more than those in an actual aspect in some cases. However, the illustration is only one example, and does not limit the interpretation of the present invention. In the present specification and each drawing, similar elements to those described earlier for the already-described drawings are denoted with the same or similar reference characters, and detailed description for them is appropriately omitted in some cases.

In the following embodiments, a liquid crystal display apparatus displaying images by using visible light scattering made by liquid crystal molecules will be exemplified and explained as an example of a display panel used in combination with a glass panel.

And, the liquid crystal display apparatus is an apparatus that forms the display images by changing orientation of molecules contained in a liquid crystal layer, and needs a light source. In the embodiments explained below, the light source is arranged separately from the display panel. Therefore, the display panel and a light source module that supplies the visible light to the display panel will be explained to be distinguished from each other.

<Transparent Display Panel>

Figure 2:
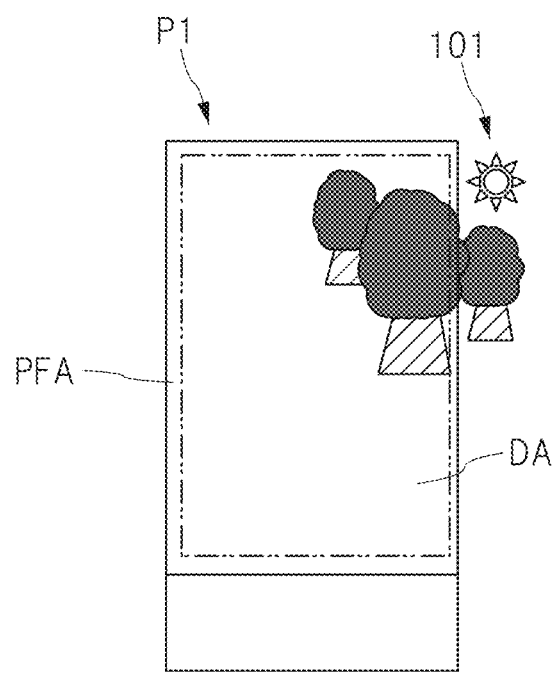
FIG. 2 is an explanatory diagram illustrating an example of the background visually recognized through the transparent display panel apparatus.

First, a feature of so-called transparent display panel will be explained. FIG. 1 is an explanatory diagram illustrating a positional relation in a case in which an observer on one surface side of a transparent display panel visually recognizes a background on the other side through the transparent display panel. FIG. 2 is an explanatory diagram illustrating an example of the background visually recognized through the transparent display panel apparatus.

When an observer 100 looks at the other side from one side of a display panel P1 as illustrated in FIG. 1, a background 101 is visually recognized through the display panel P1. When both a display region DA and a peripheral region PFA outside the display region DA transmit the light as illustrated in FIG. 2, the observer can visually recognize the entire background 101 without uncomfortable feeling. Meanwhile, when the peripheral region PFA has a light blocking property not transmitting the light, a part of the background 101 to be visually recognized through the display panel P1 is blocked by the peripheral region PFA, and therefore, occasionally makes the observer 100 (see FIG. 1) uncomfortable. In the case of the display panel P1 that is the transparent display panel as described above, each of the display region DA and the peripheral region PFA preferably has a transmissivity to the visible light. And, in a viewpoint of the visual recognition of the background 101 without the uncomfortable feeling, the display region DA and the peripheral region PFA are particularly preferable to be almost the same as each other in the visible-light transmissivity.

Figure 3:
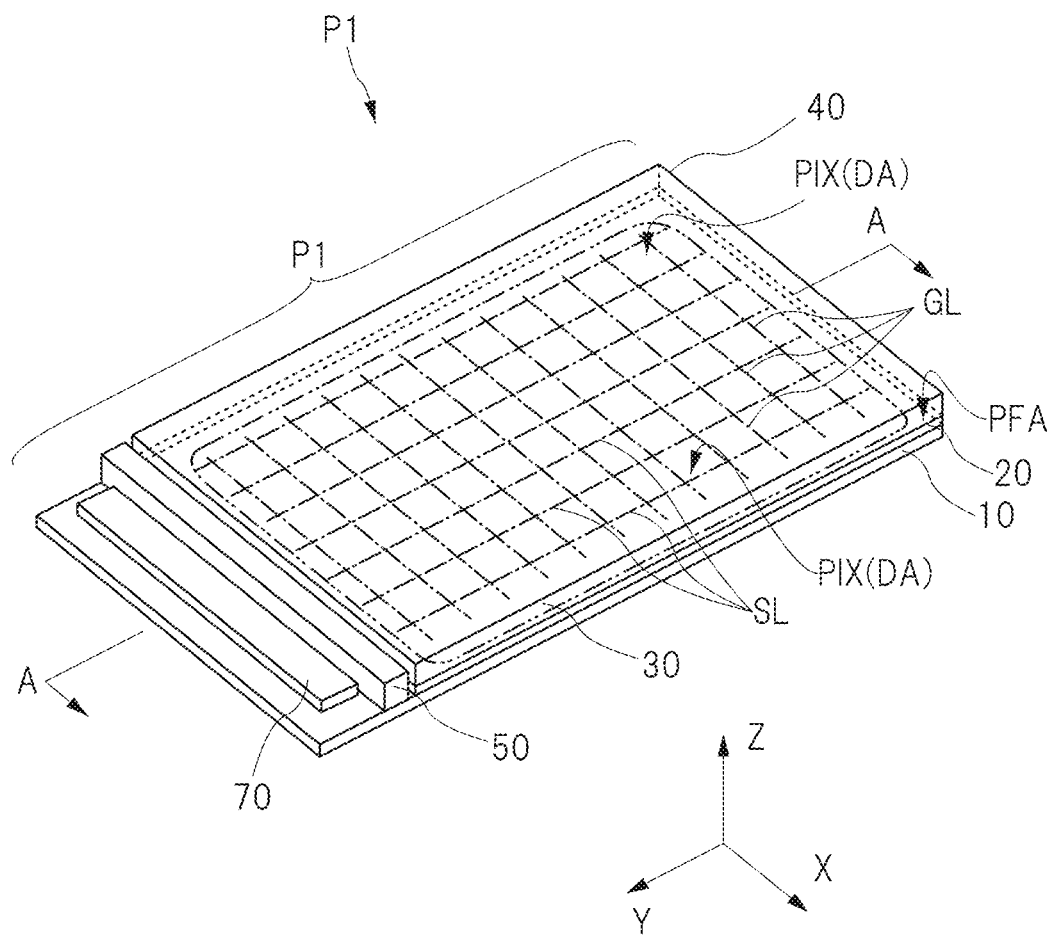
FIG. 3 is a perspective view illustrating an example of a transparent display panel illustrated in FIG. 1.
Figure 5:
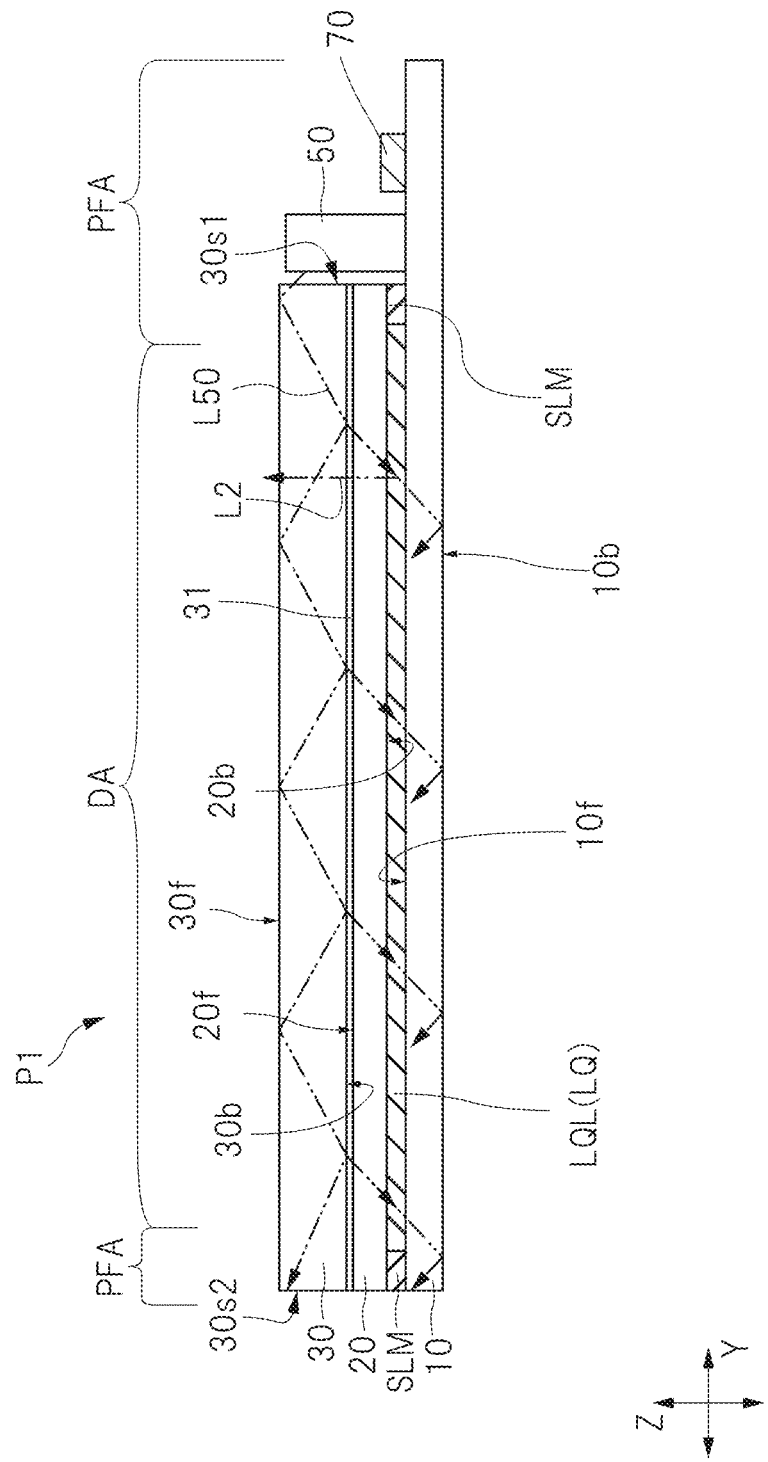
FIG. 5 is a cross-sectional view taken along a line A-A of FIG. 3.
Figure 6:
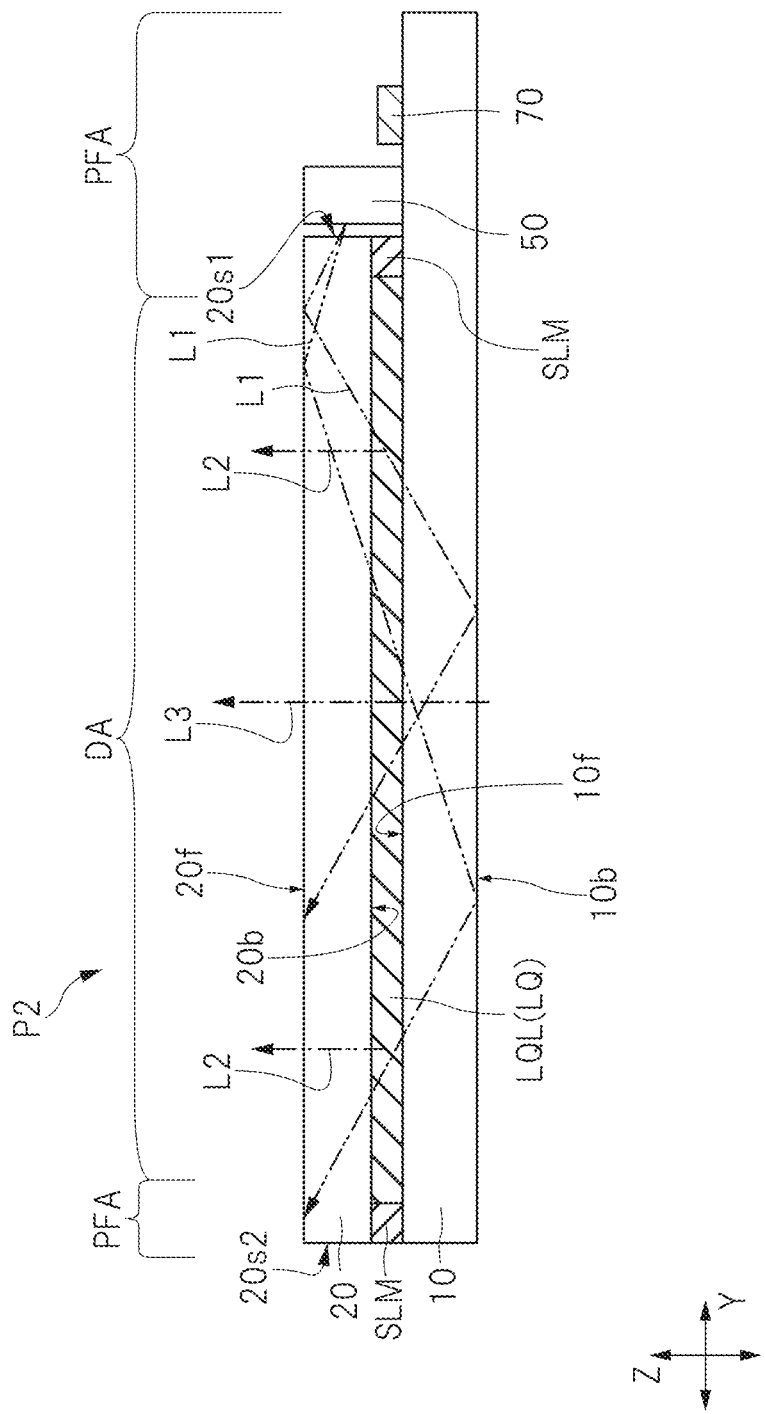
FIG. 6 is an explanatory diagram schematically illustrating a path of light emitted from a light source unit of a transparent display apparatus according to a study example.

FIG. 3 is a perspective view illustrating an example of a transparent display panel illustrated in FIG. 1. In FIG. 3, a boundary between the display region DA and the peripheral region PFA is illustrated with a dashed double-dotted line. And, in FIG. 3, of a circuit included in the display panel P1, some (specifically a gate line GL and a source line SL) of signal wirings transmitting signals for driving the liquid crystal are schematically illustrated with a dashed dotted line. The following drawings including FIG. 3 will be explained so that a direction along a thickness direction of the display panel P1 is a "Z" direction, an extension direction of one side of the display panel P1 on an X-Y plane orthogonal to the Z direction is an "X" direction, and a direction crossing the direction is a "Y" direction. FIG. 5 is a cross-sectional view taken along a line A-A of FIG. 3. FIG. 6 is an explanatory diagram schematically illustrating a path of light emitted from a light source unit of a transparent display apparatus according to a study example.

As illustrated in FIG. 3, the display panel P1 of the present embodiment includes a substrate (array substrate) 10, a substrate (counter substrate) 20, a light guide panel (also referred to as first light guide panel or a first cover glass) 30, a light source unit (first light source unit) 50 and a driver circuit 70.

In configuration as the display apparatus, for example, a control circuit, a flexible board connected to the display panel P1, an enclosure or others may be included in addition to each unit of the display panel P1 illustrated in FIG. 3. In FIG. 3, illustration of other units than the display panel P1 is omitted.

The display panel P1 includes the display region DA where an image is formed in response to an input signal fed from the outside, and a peripheral region (frame region) PFA located around the display region DA. Note that, while the display region DA of the display panel P1 illustrated in FIG. 3 has a quadrangular shape, the display region DA may have a shape other than the quadrangular shape, such as a polygonal shape or a circular shape. In plan view in which a display surface is viewed, the display region DA is an effective region where the display panel P1 displays the image. Each of the substrates 10 and 20 and the light guide panel 30 is at a position overlapping the display region DA in plan view. In the example illustrated in FIG. 1, each of the side light source unit 50 and the driving circuit 70 is mounted on the substrate 10. However, as a modification example, a substrate for light source other than the substrate 10 not illustrated may be attached to the peripheral region PA of the substrate 10, and the light source unit 50 may be mounted on the substrate for light source not illustrated.

Figure 4:
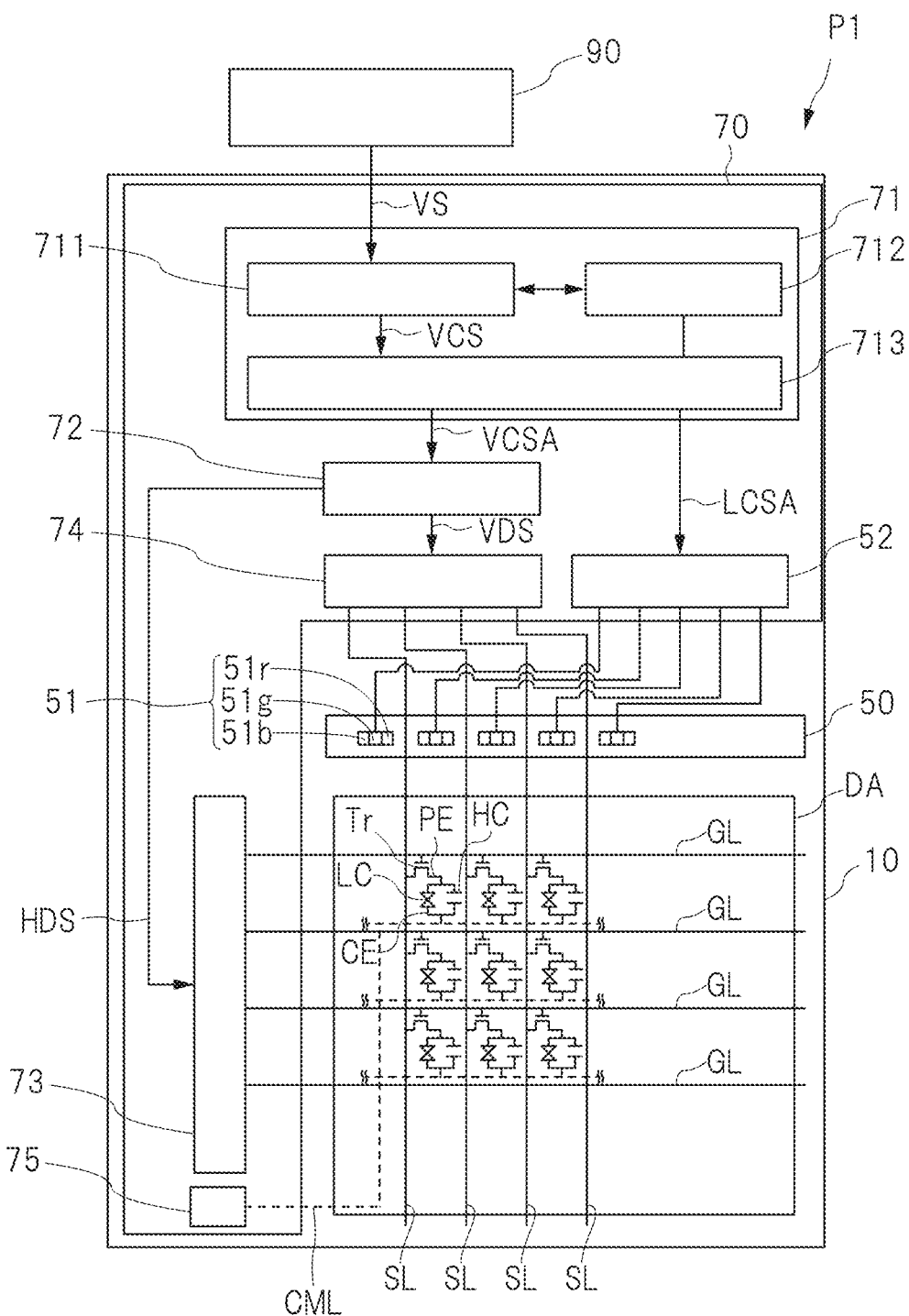
FIG. 4 is a circuit block diagram illustrating an example of a circuit included in the display panel of FIG. 3.

First, a configuration example of the circuit included in the display panel P1 illustrated in FIG. 3 will be explained. FIG. 4 is a circuit block diagram illustrating an example of the circuit included in the display panel of FIG. 3. A wiring path connected to a common electrode CE illustrated in FIG. 4 is formed on, for example, the substrate 20 illustrated in FIG. 5 described later. In FIG. 4, wirings formed on the substrate 20 are indicated by dotted lines. In the example illustrated in FIG. 4, a light source control unit 32 is included in the driving circuit 40. As a modification example, the light source control unit 52 may be provided separately from the driving circuit 70. The light source unit 50 and the light source control unit 52 may be arranged separately from the driving circuit 70 as a modification example. As described above, the substrate for light source other than the substrate not illustrated may be attached to the peripheral region PA of the substrate 10, and the light source unit may be mounted on the substrate for light source not illustrated. In this case, the light source control unit 52 is formed in, for example, the substrate for light source not illustrated. Alternatively, the light source control unit 52 is formed in an electronic component mounted on the substrate for light source not illustrated.

In the example illustrated in FIG. 4, the driving circuit 70 includes a signal processing circuit 71, a pixel control circuit 72, a gate driving circuit 73, a source driving circuit 74, and a common potential driving circuit 75. The light source unit 50 includes, for example, a light emitting diode element 51r, a light emitting diode element 51g and a light emitting diode element 51b. Note that combination of the light emitting diode element 51r, the light emitting diode element 51g and the light emitting diode element 51b will be explained in detail later. Since the substrate 10 has a larger area than the substrate 20 as illustrated in FIG. 3, the driving circuit 70 is provided on the substrate 10.

The signal processing circuit 71 includes an input signal analyzing unit (input signal analyzing circuit) 711, a storage unit (storage circuit) 712, and a signal adjusting unit 713. The display panel P1 includes a control unit 90 including a control circuit that controls the image display. An input signal VS is input from the control unit 90 to the input signal analyzing unit 711 of the signal processing circuit 71 through a wiring path such as a flexible wiring board not illustrated. The input signal analyzing unit 711 performs an analyzing process on the basis of the input signal VS input thereto from the outside to generate an input signal VCS. The input signal VCS is, for example, a signal that determines, based on the input signal VS, a gradation value given to each pixel PIX (see FIG. 3) of the display panel P1 (see FIG. 3).

The signal adjusting unit 713 generates an input signal VCSA from the input signal VCS input thereto from the input signal analyzing unit 711. The signal adjusting unit 713 transmits the input signal VCSA to the pixel control circuit 72, and transmits a light source control signal LCSA to the light source control unit 52. The light source control signal LCSA is, for example, a signal containing information about light quantity of the light source unit 50 set in accordance with the gradation value input to the pixel PIX.

The pixel control circuit 72 generates a horizontal driving signal HDS and a vertical driving signal VDS on the basis of the input signal VCSA. For example, in the present embodiment, since a field sequential driving method is performed, the horizontal driving signal HDS and the vertical driving signal VDS are generated for each color, light of which can be emitted by the light source unit 50. The gate driving circuit 73 sequentially selects the gate lines GL of the display panel P1 (see FIG. 3) within one vertical scanning period on the basis of the horizontal driving signal HDS. A selection order of the gate lines GL is optional. As illustrated in FIG. 3, the plurality of gate lines (signal wirings) GL extend in the X direction, and are arranged in the Y direction.

To each source line SL of the display panel P1 (see FIG. 3), the source driving circuit 74 feeds a gradation signal corresponding to an output gradation value of each pixel PIX (see FIG. 3) within one horizontal scanning period on the basis of the vertical driving signal VDS. As illustrated in FIG. 3, the plurality of source lines (signal wirings) SL extend in the Y direction, and are arranged in the X direction. One pixel PIX is formed for each intersection between the gate lines GL and the source lines SL. The switching element Tr (see FIG. 4) is formed at each intersection between the gate lines GL and the source lines SL. The plurality of gate lines GL and source lines SL illustrated in FIGS. 3 and 4 correspond to the plurality of signal wirings that transmit the driving signals for driving the liquid crystal LQ illustrated in FIG. 5 (and FIG. 6) described later.

For example, a thin-film transistor is used as the switching element Tr illustrated in FIG. 4. The type of the thin-film transistor is not limited to any particular type, and, for example, the followings are exemplified. In classification based on a gate position, a bottom-gate transistor and a top-gate transistor are exemplified. Also, in classification based on the number of gates, a single-gate thin-film transistor and a double-gate thin-film transistor are exemplified. One of a source electrode and a drain electrode of the switching element Tr is connected to the source line SL, a gate electrode is connected to the gate line GL, and the other of the source electrode and the drain electrode is connected to one end of a capacitor of the polymer dispersed liquid crystal LC (the liquid crystal LQ illustrated in FIGS. 5 and 6). One end of the capacitor of the polymer dispersed liquid crystal LC is connected to the switching element Tr though a pixel electrode PE, and the other end is connected to a common potential wiring CML through the common electrode CE. A holding capacitor HC is generated between the pixel electrode PE and a holding capacitor electrode electrically connected to the common potential wiring CML. Note that the common potential wiring CML is provided by the common potential driving circuit 75.

Next, a light path of the light emitted from the light source unit 50 in the display panel P1 illustrated in FIG. 3 will be explained. For simple explanation, the explanation will be made with reference to a display panel P2 having a simplified structure as illustrated in FIG. 6. Note that the display panel P2 illustrated in FIG. 6 is the same as the display panel P1 illustrated in FIG. 5 except that the light guide panel 30 is not included. In the case of the display panel P2, the substrate 20 is used as the light guide panel. Therefore, the following explanation for the display panel P2 is also applicable to the display panel P1 illustrated in FIG. 5.

As illustrated in FIG. 6, the display panel P2 includes the substrate 10 and the substrate 20 bonded together to face each other while sandwiching a liquid crystal layer LQL therebetween. The substrate 10 and the substrate 20 are arranged in the Z direction which is the thickness direction of the display panel P1. In other words, the substrate 10 and the substrate 20 face each other in the thickness direction (Z direction) of the display panel P1. The substrate 10 has a front surface (main surface, surface) 10f facing the liquid crystal layer LQL (and the substrate 20). The substrate 20 has a back surface (main surface, surface) 20b facing the front surface 10f of the substrate 10 (and the liquid crystal layer LQL). The substrate 10 is an array substrate on which a plurality of transistors (transistor elements) serving as switching elements (active elements) Tr (see FIG. 4) are arrayed. The substrate 20 is a substrate provided on the display surface side. The substrate 20 can also be interpreted as an opposing substrate meaning a substrate facing the array substrate.

The liquid crystal layer LQL containing the liquid crystal LQ is located between the front surface 10f of the substrate 10 and the back surface 20b of the substrate 20. The liquid crystal layer LQL is an optical modulation element. The display panel P2 has a function of modulating the light passing therethrough by controlling a state of an electric field formed around the liquid crystal layer LQL via the switching elements described above. The display region DA on the substrate 10 and the substrate 20 overlaps the liquid crystal layer LQL as illustrated in FIG. 6.

Also, the substrate 10 and the substrate 20 are bonded to each other so as to sandwich a seal portion (seal member) SLM therebetween. As illustrated in FIGS. 3 and 6, the seal portion SLM (see FIG. 6) is arranged in the peripheral region PFA to surround the display region DA. As illustrated in FIG. 6, the liquid crystal layer LQL is located inside the seal portion SLM. The seal portion SLM plays a role of a seal that seals the liquid crystal between the substrate 10 and the substrate 20. The seal portion SLM also plays a role of an adhesive that bonds the substrate 10 and the substrate 20 together.

The light source unit 50 is arranged at a position facing a side surface 20s1 of the substrate 20. As schematically indicated by a dashed double-dotted line in FIG. 6, light-source light L1 emitted from the light source unit 50 propagates toward a direction being away from the side surface 20s1 while being reflected by the back surface 10b of the substrate 10 and the front surface 20f of the substrate 20. In a propagation path of the light-source light L1, the back surface 10b of the substrate 10 and the front surface 20f of the substrate are boundaries each between a medium having a large refractive index and a medium having a small refractive index. Thus, when an incident angle of the light-source light L1 on the front surface 20f and the back surface is larger than an optimum angle, the light-source light L1 is totally reflected on the front surface 20f and the back surface 10b.

The liquid crystal LQ is polymer dispersed liquid crystal LC (see FIG. 4), and contains a liquid crystalline polymer and liquid crystal molecules. The liquid crystalline polymer is formed in stripes, and the liquid crystal molecules are dispersed in gaps of the liquid crystalline polymer. Each of the liquid crystalline polymer and the liquid crystal molecule has optical anisotropy or refractive anisotropy. The responsiveness of the liquid crystalline polymer to the electric field is lower than the responsiveness of the liquid crystal molecules to the electric field. The orientation direction of the liquid crystalline polymer hardly changes regardless of the presence or absence of the electric field. On the other hand, the orientation direction of the liquid crystal molecules varies depending on the electric field in a state where a voltage equal to or higher than a threshold is applied to the liquid crystal LQ. In a state where the voltage is not applied to the liquid crystal LQ, the optical axes of the liquid crystalline polymer and the liquid crystal molecules are parallel to each other, and the light-source light L1 that has entered the liquid crystal layer LQL is hardly scattered in but transmitted through the liquid crystal layer LQL (transparent state). In a state where the voltage is applied to the liquid crystal LQ, the optical axes of the liquid crystalline polymer and the liquid crystal molecules intersect each other, and the light-source light L1 that has entered the liquid crystal LQ is scattered in the liquid crystal layer LQL (scattered state). In the display panel P2, the transparent state and the scattered state are controlled by controlling the orientation of the liquid crystal LQ in the propagation path of the light-source light L1. In the scattered state, by the liquid crystal LQ, the light-source light L1 is emitted as emitted light L2 from the front surface 20f side to the outside of the display panel P2. Background light L3 that has entered from the back surface 10b side is transmitted through the substrate 10, the liquid crystal layer LQL and the substrate 20, and is emitted from the front surface 20f to the outside. The emitted light L2 and the background light L3 are visually recognized by the observer on the front surface 20f side. The observer can recognize the combination of the emitted light L2 and the background light L3. Such a display panel that enables the observer to recognize the overlapping display image and background is called a transparent display panel.

The display panel P1 illustrated in FIG. 5 is different from the display panel P2 illustrated in FIG. 6 in that the light-source light L50 emitted from the light source unit 50 enters the liquid crystal layer LQL through the light guide panel 30 arranged on the substrate 20. The display panel (display apparatus) P1 includes the substrate 10 including the front surface 10f and the back surface 10b opposite to the front surface the substrate 20 including the back surface 20b facing the front surface 10f and the front surface 20f opposite to the back surface 20b, and the liquid crystal layer LQL arranged between the front surface 10f of the substrate 10 and the back surface 20b of the substrate 20. This point is the same as that of the display panel P2 illustrated in FIG. 6. In addition to these components, the display panel P1 further includes: the light guide panel 30 bonded and fixed onto the back surface 10b of the substrate 10 through an adhesive layer 31; and the light source unit 50 including a plurality of light emitting diode elements 51 (see FIG. 4) and arranged on the front surface 10f of the substrate 10 at a position facing a side surface 30s1 of the light guide panel 30.

The light guide panel 30 includes a back surface 30b facing the front surface 20f of the substrate 20 and a front surface 30f opposite to the back surface 30b. Also, the light guide panel 30 includes the side surface 30s1 facing the light source unit 50 and a side surface 30s2 opposite to the side surface 30s1. The light guide panel is bonded and fixed onto the substrate 20 through the adhesive layer 31. At least in the display region DA, a gap between the light guide panel 30 and the substrate 20 is filled with the adhesive layer 31. In an example illustrated in FIG. 5, the adhesive layer 31 is bonded to the front surface 30f of the light guide panel 30 as a whole. The light-source light L50 emitted from the light source unit 50 enters the light guide panel 30 through the side surface 30s1, and travels toward the side surface 30s2 while reflecting.

The adhesive layer 31 is made of a transparent resin material capable of transmitting the visible light. As examples of the adhesive layer 31 transmittable to the visible light, a transparent bonding sheet that is called Optical Clear Adhesive (OCA) of a sheet shape, an Optical Clear Resin (OCR) used by hardening of a liquid-type transparent adhesive and others are exemplified. Each refractive index of the substrates 10 and 20 and the light guide panel 30 includes various modification examples, but each refractive index is, for example, about 1.5. The refractive index of the adhesive layer 31 is, for example, about 1.37 to 1.5 that is near the refractive index of the light guide panel 30.

Under the above-described conditions, a part of the light-source light L50 does not reflect on the boundary with the adhesive layer 31, but enters the substrate 20. The light having entered the substrate 20 travels toward the liquid crystal layer LQL as similar to the light-source light L1 illustrated in FIG. 6, and enters the liquid crystal layer LQL. The light having scattered in the liquid crystal layer LQL is emitted as the emitted light L2 toward the outside of the display panel P1 through the front surface 20f side. On the other hand, the light not having scattered in the liquid crystal layer LQL is reflected on the back surface 10b of the substrate 10 and the front surface 20f of the substrate (or the front surface 30f of the light guide panel and propagates toward a direction being away from the light-source unit 50.

<Structure of Light Source Unit>

Figure 7:
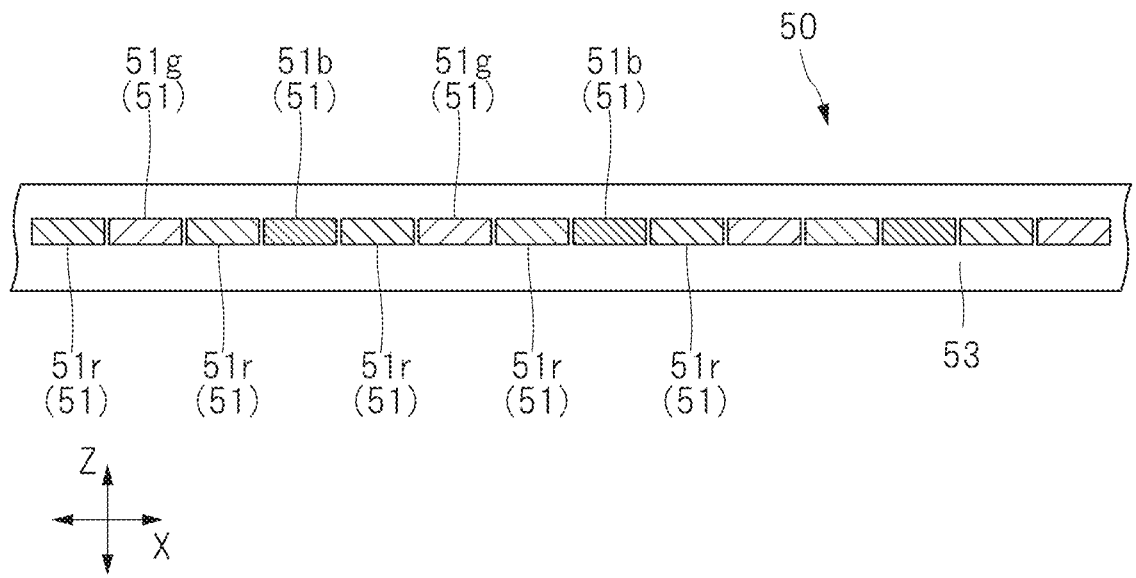
FIG. 7 is a plan diagram illustrating an example of arrangement of a plurality of LED elements inside the light source unit illustrated in FIG. 3.
Figure 8:
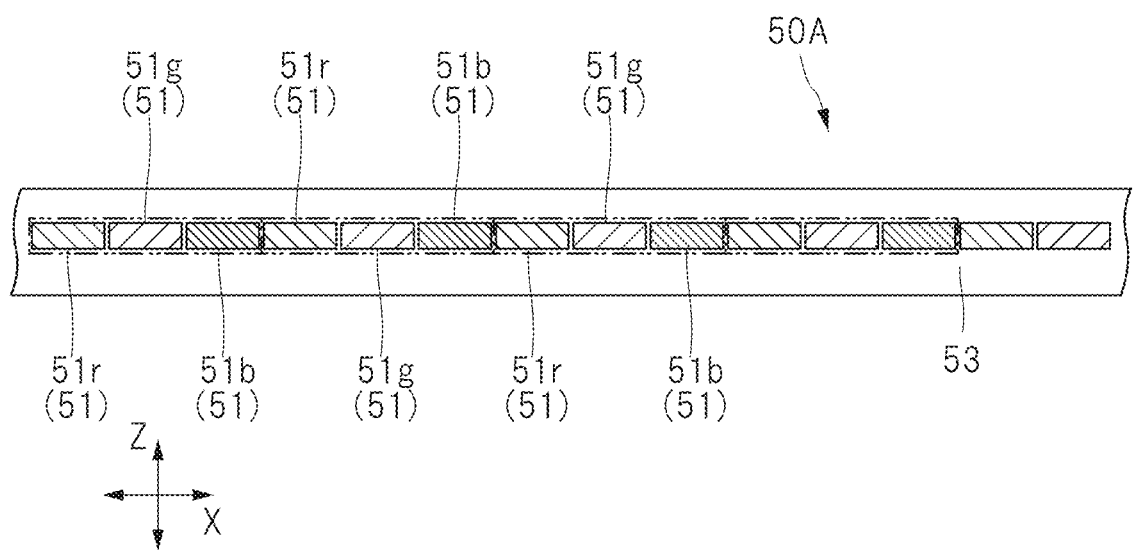
FIG. 8 is a plan view illustrating a study example compared to FIG. 7.
Figure 9:
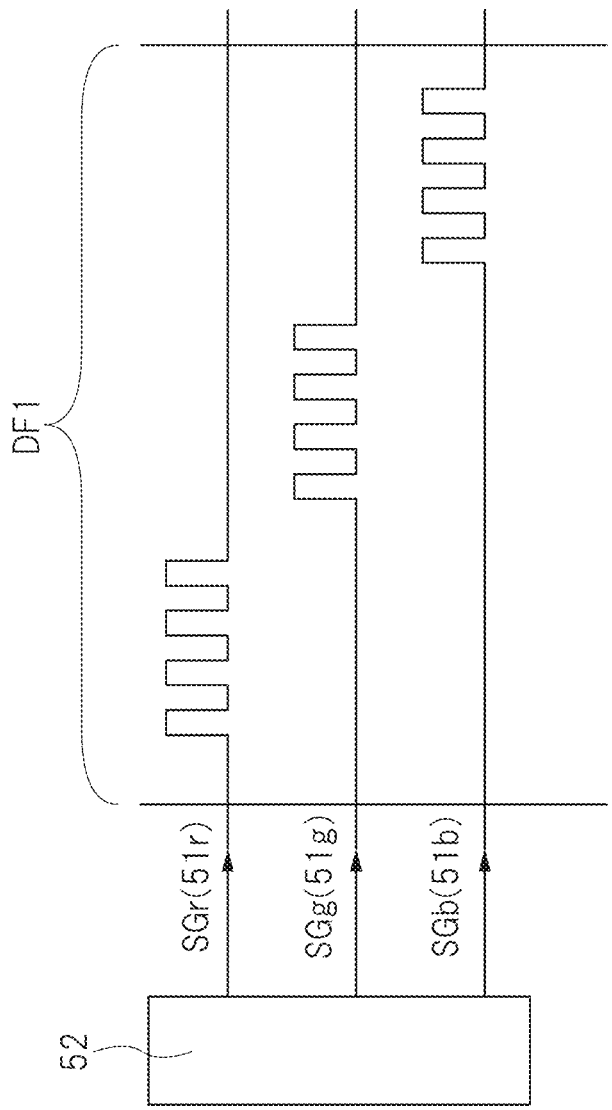
FIG. 9 is a chart illustrating an example of timing at which light emitting diode elements of three types illustrated in FIG. 7 are driven.

Next, a structure of the light source unit will be explained. FIG. 7 is a plan view illustrating an example of arrangement of the plurality of LED elements inside the light source unit illustrated in FIG. 3. The plane illustrated in FIG. 7 is an X-Z plane including an X direction and a Z direction illustrated in FIG. 3, and is a plane in which the light source unit 50 is viewed in a direction toward the light guide panel 30. FIG. 8 is a plan view illustrating a study example compared to FIG. 7. Each of FIGS. 7 and 8 is a plan view, but is hatched for easily identifying the type of the light emitting diode element 51. FIG. 9 is a chart illustrating an example of timing at which light emitting diode elements of three types illustrated in FIG. 7 are driven.

As illustrated in FIG. 7, the light source unit 50 includes a plurality of light emitting diode elements 51 and a lens 53. The lens 53 is arranged between the light guide panel 30 illustrated in FIG. 3 and the plurality of light emitting diode elements 51 illustrated in FIG. 7. The plurality of light emitting diode elements 51 include a light emitting diode element 51r capable of emitting light of first color (such as red color), a light emitting diode element 51g capable of emitting light of second color (such as green color) different from the first color, and a light emitting diode element 51b capable of emitting light of third color (such as blue color) different from the first color and the second color. In the X direction, the plurality of the light emitting diode elements 51 are arranged along the side surface 30s1 of the light guide panel 30. A light source unit 50A illustrated in FIG. 8 is different from the light source unit 50 illustrated in FIG. 7 in the arrangement of the plurality of the light emitting diode elements 51 but is the same as that in other structures.

As explained with reference to FIG. 4, the display apparatus of performing the color display includes a control unit (light-source control unit 52) for controlling the plurality of the light emitting diode elements 51 to be lighted/unlighted. As exemplified in FIG. 9, the light-source control unit 52 controls the light emitting diode element 51r, the light emitting diode element 51g and the light emitting diode element 51b to be lighted at respective different timing in one display period DF1. Specifically, the light-source control unit 52 outputs a signal SGr for controlling the light emitting diode element 51r to be lighted/unlighted to the light emitting diode element 51r, outputs a signal SGg for controlling the light emitting diode element 51g to be lighted/unlighted to the light emitting diode element 51g, and outputs a signal SGb for controlling the light emitting diode element 51b to be lighted/unlighted to the light emitting diode element 51b. In the example illustrated in FIG. 9, each of the signals SGr, SGg and Sgb is a pulse signal.

In order to adjust the white balance of the display apparatus, the luminance of the light emitting diode element of each color is adjusted based on chromaticity of each color of RGB in monochromatic case. Specifically, in the adjustment of the white balance, the electric current or the lighting time input to each of the light emitting diode elements 51r, 51g and 51b is adjusted so as to reduce variation of the luminance of each color of RGB in the display period DF1.

In this case, in the case of the light source unit illustrated in FIG. 8, single light emitting diode element 51r, single light emitting diode element 51g and single light emitting diode element 51b are repeatedly arranged along the X direction. Therefore, the total number of the light emitting diode elements 51r, the total number of the light emitting diode elements 51g and the total number of the light emitting diode elements 51b included in the light source unit 50A are equal to one another. However, the light fluxes of the light output from the light emitting diode elements 51r, the light emitting diode elements 51g and the light emitting diode elements 51b are not always equal to one another. The light flux of the light varies depending on the specification of the light emitting diode element 51, and a case in which the light flux of the red color emitted from the light emitting diode elements 51r is lower than the light flux of the green color emitted from the light emitting diode elements 51g will be exemplified and explained below.

When the light flux of the red color emitted from the light emitting diode elements 51r is lower than the light flux of the green color emitted from the light emitting diode elements 51g, if the same electric current is supplied to the light emitting diode elements 51r and the light emitting diode elements 51g while the lighting time is the same therebetween, the luminance of the red color is insufficient. Therefore, in order to adjust the white balance, it is necessary to take at least either one or both of the following two countermeasures. The first countermeasure is to make adjustment so that the electric current supplied to the light emitting diode elements 51r is larger than the electric current supplied to the light emitting diode elements 51g in the display period DF1. The second countermeasure is to make adjustment so that the lighting time of the light emitting diode elements 51r (in other words, the pulse number of the signal SGr) is longer than the lighting time of the light emitting diode elements 51g (in other words, the pulse number of the signal SGg) in the display period DF1. When difference between the light flux of the red color emitted from the light emitting diode elements 51r and the light flux of the green color emitted from the light emitting diode elements 51g is large, the light emitting diode elements 51r are used at a value that is nearly 100% of the rated power output, and the light emitting diode elements 51g are used at a value that is significantly lower than the rated power output. It cannot be said that such a use method is efficient.

Accordingly, the inventors of the present application have paid attention to the case of the large difference in the light flux based on the color of the light emitting diode element 51, and have studied an arrangement method for making the total number of the light emitting diode elements 51 of color having a lower chromaticity (in other words, color having lower light flux) larger than the total number of the light emitting diode elements 51 of color having a higher chromaticity (in other words, color having higher light flux).

As illustrated in FIG. 7, in the case of the light source unit 50, a plurality of (in FIG. 7, two) light emitting diode elements 51r, single or a plurality of (in FIG. 7, one) light emitting diode element 51g and single or a plurality of (in FIG. 7, one) light emitting diode element 51b are repeatedly arranged along the X direction. Specifically, in the case of the light source unit 50, two light emitting diode elements 51r, one light emitting diode element 51g and one light emitting diode element 51b are made to be one arrangement set, and this arrangement set is repeatedly arranged. The total number of the light emitting diode elements 51r is larger than the total number of the light emitting diode elements 51g. The light flux of the light of the red color (the chromaticity of the light of the red color) emitted from the light emitting diode elements 51r is lower than light flux the light of the green color (the chromaticity of the light of the green color) emitted from the light emitting diode elements 51g.

In the case of the light source unit 50, since the total number of the light emitting diode elements 51r emitting the light having the lower chromaticity is larger than the total number of the light emitting diode elements 51g, the white balance can be adjusted without the significant decrease of the output of the light emitting diode elements 51g. In other words, according to the present embodiment, each of the plurality of light emitting diode elements 51 can be efficiently used.

And, in the example illustrated in FIG. 7, the light flux of the light of the red color emitted from the light emitting diode elements 51r is lower than the light flux of the light of the blue color emitted from the light emitting diode elements 51b. Further, the total number of the light emitting diode elements 51r is larger than the total number of the light emitting diode elements 51g. In this case, the white balance can be adjusted without the significant decrease of the output of the light emitting diode elements 51b.

Meanwhile, the plurality of light emitting diode elements 51 are arranged along the X direction, and therefore, when the light emitting diode elements 51 emitting the light of the same color are successively arranged, a width of the light beam of specific color (such as a width of light beam of the red color) is increased. In order to avoid this, the plurality of light emitting diode elements 51 are particularly preferably arranged as described below. Specifically, as illustrated in FIG. 7, the light emitting diode element 51g or the light emitting diode element 51b is alternately arranged between the adjacent light emitting diode elements 51r in the X direction. In this case, the width of light beam of the red color can be prevented from being larger than the width of light beam of the green color and the width of light beam of the blue color.

<Modification Example>

Next, a modification example compared to the arrangement of the light emitting diode elements 51 illustrated in FIG. 7 will be explained. Each of FIGS. 10 to 12 is a plan view illustrating the modification example compared to the arrangement of the light emitting diode elements illustrated in FIG. 7.

Figure 10:
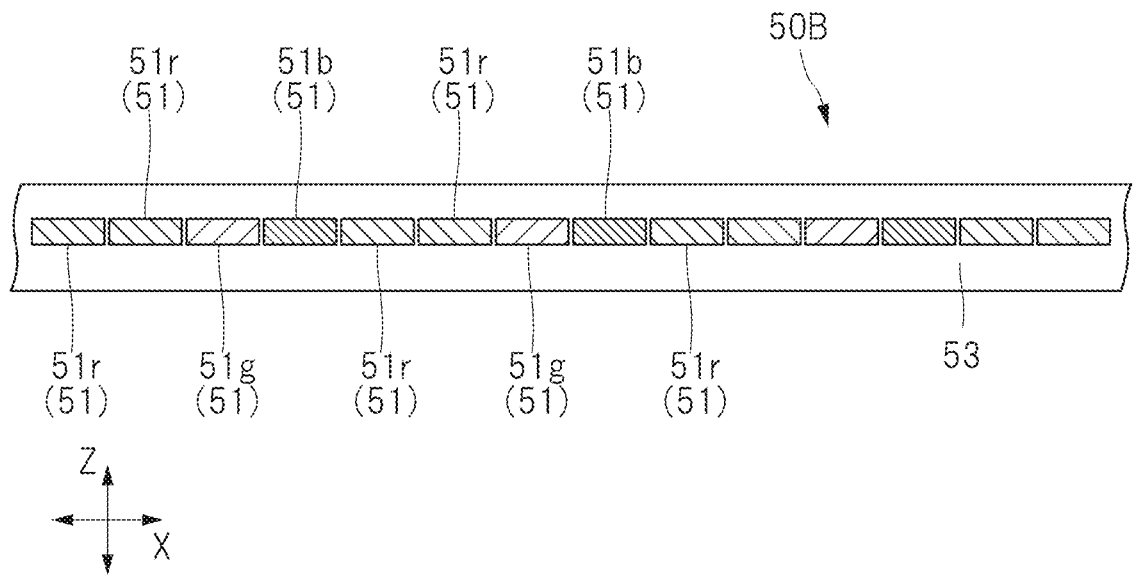
FIG. 10 is a plan diagram illustrating a modification example compared to the arrangement of the light emitting diode elements illustrated in FIG. 7.

A light source unit 50B illustrated in FIG. 10 is different from the light source unit 50 illustrated in FIG. 7 in that two light emitting diode elements 51r are adjacent to each other. The total number of the light emitting diode elements 51r, the total number of the light emitting diode elements 51g and the total number of the light emitting diode elements 51b are the same as those of the example illustrated in FIG. 7. In the light source unit 50B, the light emitting diode elements 51r of the red color are adjacent to each other, and therefore, the width of the light beam of the red color is larger than the width of the light beam of the green color and the width of the light beam of the blue color. However, even in the light source unit 50B, when the total number of the light emitting diode elements 51r of the red color having the lower chromaticity is larger than the total number of the light emitting diode elements 51g and the total number of the light emitting diode elements 51b, the plurality of light emitting diode elements 51 can be efficiently used.

Figure 11:
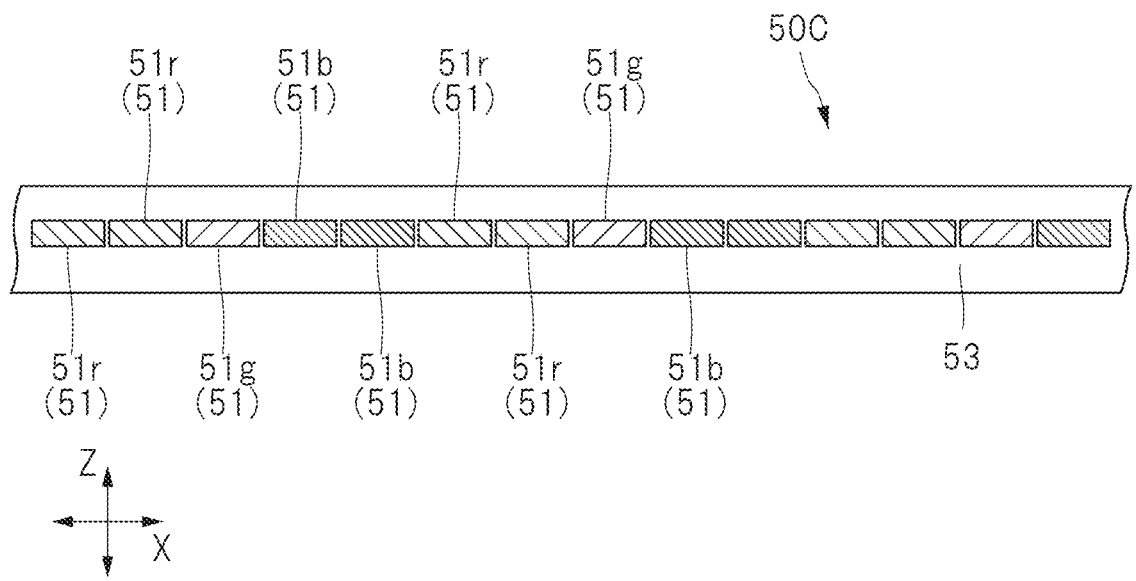
FIG. 11 is a plan diagram illustrating a modification example compared to the arrangement of the light emitting diode elements illustrated in FIG. 7.

A light source unit 50C illustrated in FIG. 11 is different from the light source unit 50 illustrated in FIG. 7 in the following point. Specifically, the light flux of the light of the blue color emitted from the light emitting diode elements 51b is lower than the light flux of the light of the green color emitted from the light emitting diode elements 51g. Therefore, in the case of the light source unit 50C, the total number of the light emitting diode elements 51b is larger than the total number of the light emitting diode elements 51g.

Figure 12:
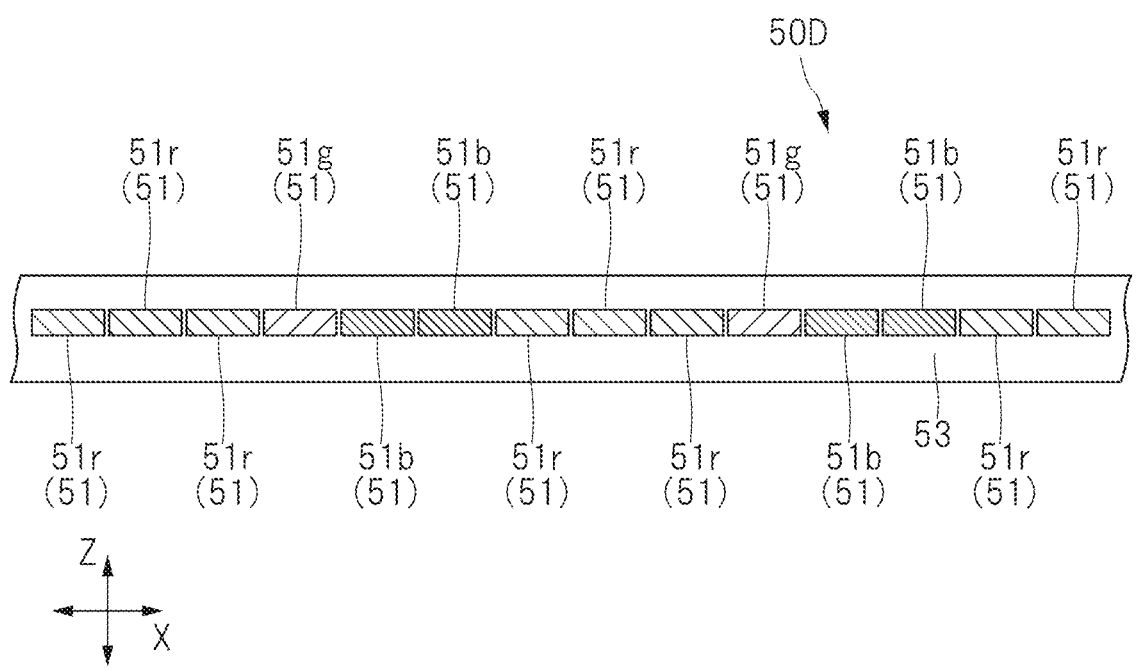
FIG. 12 is a plan diagram illustrating a modification example compared to the arrangement of the light emitting diode elements illustrated in FIG. 7.

Further, as seen in a light source unit 50D illustrated in FIG. 12, for example, three light emitting diode elements 51r, one light emitting diode elements 51g and two light emitting diode elements 51b are occasionally repeatedly arranged. In this case, the number of the light emitting diode elements 51 included in one arrangement set is large (such as six), and therefore, this case causes a larger pixel size than those of the examples (in which the number of the light emitting diode elements 51 included in one arrangement set is four) illustrated in FIGS. 7 and 10. Note that the plurality of light emitting diode elements 51 can be efficiently used as a whole by adjusting the number of the light emitting diode elements 51 of each color included in one arrangement set in accordance with the chromaticity of the light emitted from the light emitting diode element 51r, the chromaticity of the light emitted from the light emitting diode element 51g and the chromaticity of the light emitted from the light emitting diode element 51b.

The generalization of the arrangement of the light emitting diode elements 51 illustrated in FIGS. 10 to 12 can be expressed as follows. Specifically, along the X direction, the light emitting diode elements 51r, a number of which is "n", the light emitting diode elements 51g, a number of which is "m" less than n, and the light emitting diode elements 51b, a number of which is equal to or more than "m", are repeatedly arranged. In this case, the light flux of the light of the red color emitted from the light emitting diode elements 51r is lower than the light flux of the light of the green color emitted from the light emitting diode elements 51g.

The light flux of the light of each color varies depending on the specification of the light emitting diode elements 51 as described above although not illustrated. Therefore, the case of the chromaticity of the light of the red color that is lower than the chromaticity of the light of the green color has been explained above. However, the chromaticity of the light of the green color is occasionally lower than the chromaticity of the light of the red color because of the specification of the light emitting diode elements 51.

In this case, for example, when exchange between the total number of the light emitting diode elements 51r and the total number of the light emitting diode elements 51g as explained with reference to FIG. 7 is applied, the plurality of light emitting diode elements 51 can be efficiently used as a whole.

The embodiment and the typical modification examples have been explained above. However, the above-described techniques are applicable to various modification examples other than the exemplified modification examples. For example, the above-described modification examples may be combined.

Various modification examples and alteration examples could have been easily anticipated within the scope of the concept of the present invention, by those who are skilled in the art, and it would be understood that these various modification examples and alteration examples are within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the concept of the present invention.

The present invention is applicable to a display apparatus and an electronic apparatus in which the display apparatus is embedded.

What is claimed is:
1. A display apparatus comprising:
a first substrate including a first front surface and a first back surface opposite to the first front surface;
a liquid crystal layer arranged on the first front surface of the first substrate;
a light guide panel including a first surface facing the first front surface, a second surface opposite to the first surface and a first side surface crossing the first surface and the second surface; and
a light source unit including a plurality of light emitting diode elements arranged in a first direction at a position facing the first side surface of the light guide panel, wherein the plurality of light emitting diode elements includes:
  a first light emitting diode element capable of emitting light of first color;
  a second light emitting diode element capable of emitting light of second color different from the first color; and
  a third light emitting diode element capable of emitting light of third color different from the first color and the second color,
in the first direction, a plurality of the first light emitting diode elements, single or a plurality of the second light emitting diode elements and single or a plurality of the third light emitting diode elements are repeatedly arranged,
the total number of the first light emitting diode elements is larger than the total number of the second light emitting diode elements, and
light flux of the light of the first color emitted from the first light emitting diode elements is lower than light flux of the light of the second color emitted from the second light emitting diode elements.

2. The display apparatus according to claim 1,
wherein the total number of the first light emitting diode elements is larger than the total number of the third light emitting diode elements, and
the light flux of the light of the first color emitted from the first light emitting diode elements is lower than light flux of the light of the third color emitted from the third light emitting diode elements.

3. The display apparatus according to claim 2,
wherein, in the first direction, the second light emitting diode element or the third light emitting diode element is alternately arranged between the first light emitting diode elements adjacent to each other.

4. The display apparatus according to claim 1,
wherein the total number of the third light emitting diode elements is larger than the total number of the second light emitting diode elements, and
light flux of the light of the third color emitted from the third light emitting diode elements is lower than the light flux of the light of the second color emitted from the second light emitting diode elements.

5. The display apparatus according to claim 1 further comprising
  a control unit configured to control the plurality of light emitting diode elements to be lighted/unlighted,
  wherein the control unit controls the first light emitting diode element, the second light emitting diode element and the third light emitting diode element to be lighted at respective different timings in a first display period.

6. The display apparatus according to claim 2 further comprising
  a control unit configured to control the plurality of light emitting diode elements to be lighted/unlighted,
  wherein the control unit controls the first light emitting diode element, the second light emitting diode element and the third light emitting diode element to be lighted at respective different timings in a first display period.

7. The display apparatus according to claim 3 further comprising
  a control unit configured to control the plurality of light emitting diode elements to be lighted/unlighted,
  wherein the control unit controls the first light emitting diode element, the second light emitting diode element and the third light emitting diode element to be lighted at respective different timings in a first display period.

8. A display apparatus comprising:
  a first substrate including a first front surface and a first back surface opposite to the first front surface;
  a liquid crystal layer arranged on the first front surface of the first substrate;
  a light guide panel including a first surface facing the first front surface, a second surface opposite to the first surface and a first side surface crossing the first surface and the second surface; and
  a light source unit including a plurality of light emitting diode elements arranged in a first direction at a position facing the first side surface of the light guide panel,
  wherein the plurality of light emitting diode elements includes:
    a first light emitting diode element capable of emitting light of first color;
    a second light emitting diode element capable of emitting light of second color different from the first color; and
    a third light emitting diode element capable of emitting light of third color different from the first color and the second color,
  in the first direction, the first light emitting diode elements, a number of which is "n", the second light emitting diode elements, a number of which is "m" less than "n", and the third light emitting diode elements, a number of which is equal to or more than "m", are repeatedly arranged, and
  light flux of the light of the first color emitted from the first light emitting diode elements is lower than light flux of the light of the second color emitted from the second light emitting diode elements.

* * * * *